United States Patent [19]

Samelius et al.

[11] Patent Number: 5,462,293
[45] Date of Patent: Oct. 31, 1995

[54] CHUCK HAVING AN INTEGRATED CONE OR MACHINE SPINDLE

[75] Inventors: Anders Samelius, Linköping; Björn Ohlson, Mjölby; Stefan Lindström, Linköping, all of Sweden

[73] Assignee: ETP Transmission AB, Sweden

[21] Appl. No.: 216,013

[22] Filed: Mar. 21, 1994

[30] Foreign Application Priority Data

Mar. 22, 1993 [SE] Sweden ................................ 9300940

[51] Int. Cl.⁶ .................................................. B23B 31/117
[52] U.S. Cl. ...................... 279/4.03; 279/129; 408/143; 409/234
[58] Field of Search ................... 279/2.08, 4.01, 279/4.03, 103, 129; 409/234, 141; 408/143

[56] References Cited

U.S. PATENT DOCUMENTS

| | | | |
|---|---|---|---|
| 2,567,471 | 9/1951 | Collgert et al. | 279/4.03 |
| 5,096,345 | 3/1992 | Toyomoto | 409/234 |
| 5,127,780 | 7/1992 | Massa | 279/2.08 |

FOREIGN PATENT DOCUMENTS

| | | | |
|---|---|---|---|
| 409783 | 3/1967 | Switzerland | 279/4.03 |
| 093010928 | 6/1993 | WIPO | 279/4.03 |

*Primary Examiner*—Steven C. Bishop
*Attorney, Agent, or Firm*—Larson and Taylor

[57] ABSTRACT

A rotating holder for tools or work pieces includes a chuck in the form of a hydraulic clamp bushing. The clamp bushing comprises a thin inner sleeve or wall, a solid outer sleeve and a plastic or hydraulic pressure medium which is entrapped between the sleeves. The thin inner sleeve is arranged to both center and firmly clamp a rotating tool or work piece when the hydraulic pressure medium is being pressurized. The clamp bushing is integrated with a mounting cone or with a machine spindle by a welding or soldering joint. The clamp bushing is formed with a bore at the periphery thereof for providing an opening to some type of means for pressurizing the hydraulic pressure medium. A protection ring is formed around the periphery of the clamp bushing and is rotatable to at least two positions, in one position of which the protection ring covers the bore for the pressurization means and in another position of which a passageway is opened to the pressurization means. The clamp bushing also can have one or more fine-balancing bores which are drilled into the material thereof and which are likewise covered by the protection ring.

10 Claims, 2 Drawing Sheets

CHUCK HAVING AN INTEGRATED CONE OR MACHINE SPINDLE

FIELD OF THE INVENTION

The present invention relates to an apparatus for clamp connecting tools or work pieces in machine tools of various kinds, for instance a chuck having an integrated mounting cone shaft or an integrated machine spindle, and in which the chuck is, in particular, formed with a hydraulic clamp bushing of a type which is known per se, and which apparatus gives a better precision in machined objects than has been possible to obtain with previously known apparatus.

BACKGROUND OF THE INVENTION

The invention is especially concerned with an apparatus of the above mentioned type in which the clamp bushing is of the known type which is formed with a thin inner sleeve or inner wall, a solid outer sleeve, and a plastic or hydraulic pressure medium enclosed between said sleeves, and in which said this inner sleeve is arranged to both centre and clamp connecting a rotating tool or a work piece when the hydraulic pressure medium is pressurized, and in which the chuck is formed as an integral unit with the mounting cone shaft or with the machine spindle.

Special advantages are achieved in such an apparatus, in which the hydraulic clamp bushing is joined with the mounting cone shaft or the machine spindle by a welding and soldering method executed so that an optimum little amount of heat is developed thereby preventing a damage of existing heat treatments of the chuck and/or so as to prevent a damage of the hydraulic pressure medium of the hydraulic clamp bushing. Useful joining methods are for instance electron beam welding or laser welding or laser soldering. In such known apparatus both the hydraulic clamp bushing part and the mounting cone part or the machine spindle part generally have to be finally machined after after the welding or soldering process, so that the cone or the spindle and the clamp connection bore of the clamp bushing get an accurate radial, rotary precision.

In rotary machining of materials, like in milling, turning, drilling, threading, reaming, grinding etc. of various materials it has, since long, been practice to make use of machine tools having a spindle, or several spindles, of the rotary type, in which chucks can be mounted. Machine tools or work pieces are clamped to said chucks, either by being clamp connected by means of radially outwards acting clamp means, or most commonly by being clamped by means of radially inwards acting clamp means.

The chucks of said known apparatus generally have been formed with a conical shaft having a clamp means at the end thereof, namely the actual clamp chuck, in which the tools or the work pieces are clamped. The conical shaft of the chuck, which is the actual mounting cone, is mounted in the rotary spindle of the working machine by being pressed into an inner conical recess of said spindle.

The clamp means for the tool can be a mechanical structure having several metal elements which are, in common, screwed radially inwards towards the centre thereof, or eventually radially outwards, and which thereby clamp the tool or the work piece in the chuck.

The said known clamping means normally gives an acceptable precision for machining, but in same cases it may be desired to foresee a higher precision in the machining.

This has been made possible by means of chucks developed during the latest years, which chucks are formed with a hydraulic clamp portion of the above mentioned type having an inner and/or an outer thin wall or sleeve and inside said this wall an annular space which is filled with a plastic or hydraulic pressure medium which, upon pressurization, brings the said thin wall to expand radially inwards (and/or radially outwards) thereby centering and clamp connecting the tool or the work piece to the chuck. Correctly designed such hydraulic clamping parts or chucks provide a very accurate radial rotary precision for the clamped tool or work piece. By providing a high rotary precision it is possible to more rationally utilize the machines and the tools, for instance by using higher feeding speeds, or by foreseeing a higher precision and a better quality of the machined surfaces.

However, also in chucks having a hydraulic clamping means the above mentioned method of joining the conical shaft of the chuck with the conical recess of the machine spindle may cause imperfect so called "radial rotary precision" for the tool which is clamped in the chuck. Since the clamping means necessarily is mounted at the end of the chuck cone, and since further said chuck cone must have a certain axial length for making it possible to steadily connect the chuck to the machine spindle the distance between the clamped tool and the bearings of the machine spindle may sometimes be relatively great, and this reduces the working precision and unneccesarily stresses the bearings of the machine spindle and may cause hard wear of said bearings.

Attempts have been made to solve said last mentioned problem by mounting of the clamp part directly on the machine spindle by means screw or bolt joints, but also such connection means involve remaining sources of errors in the joint between the clamp part and the machine spindle. Also, there is a need for a relatively large space for the screw joint between the clamp part and the machine spindle, and the clamp part may become unneccessarily large and heavy.

SUMMARY OF THE INVENTION

The basis of the invention therefore has been the problem of providing a form of a rotary chuck which can be mounted in a machine tool, which provides an extraordinarily high precision as concerns the radial rotary precision of the chuck when mounted in the machine tool, which provides a high precision and quality of the machined product, in which the clamp part of the chuck is located rather close to the bearings of the machine spindle, in which it has been possible to form the clamp part with small dimensions and a light weight, and in which it has been possible to make use of the above mentioned hydraulic clamp bushing part which gives an excellent centering and at the same time is capable of a firmly connecting tool in the chuck.

The invention is based on the idea of forming the mounting means for the chuck, in particular the chuck cone or the very machine spindle, as an integrated part of the chuck itself. It might eventually have been possible to form the chuck according by originally designing the clamp bushing and the cone shaft or the machine spindle as a homogenous, integral unit, but it should be very complicated and expensive to manufacture an apparatus accordingly by an integral piece of material.

According to the invention, on the contrary, the clamp part is formed as a separate unit, and said separately manufactured clamp part is, at a suitable opportunity of the manufacturing process, weld or solder connected to the mounting cone of the machine spindle. It is thereby not necessary to form the clamp part with a particularly high precision. On the contrary the desired high radial rotary precision etc. is provided for after the clamp part has been welded or soldered to the cone or to the machine spindle in that both the tool receiving bore of the chuck and the cone or the machine spindle are finally machined after said joining process, so that the clamp part and the cone or the spindle become extremely accurately concentric. Since the chuck and the mounting part thereof are in the form an integral unit after the joining process it is possible to perform the final machining of the cone or of the bearing positions of the spindle and of the clamp bore for tools of the clamp part to present a high precision as concerns the radial rotation of the tool mounting means of the chuck and thereby also of the clamped working tool.

It is important that the weld connecting or the solder connecting of the clamp part to the cone or to the machine spindle is made is such a way that any preceding heat treatments are not being adversely affected, or so that the hydraulic medium or any part of the clamp bushing is not being damaged. The joining method has to permit the use of various materials of the cone or of the spindle and of the clamp part. The welding or the soldering thus has to be made with a minimum of heat. The joining can be made by utilizing certain modern welding methods, like electron beam welding or laser welding, which can be made without supply and transmission of especially high amounts of heat to the spindle and the chuck.

A problem is that the machining chips and dust of material is formed during the machining procedure, which chips and dust may penetrate into any possible cavities on the surfaces of the machine spindle or the tool chuck. Such a cavity is the bore of the clamp bushing by which the bushing is being pressurized and de-pressurized respectively, if this bore is filled with chips or dust of material it may make it difficult to reach the pressurizing nipple or screw, and it may also hazard the accurate balancing of the chuck.

Other bores on the surface of the chuck can be fine-balancing-bores which have been drilled in the chuck body for providing the utterly accurate balancing which is desired for a chuck of this actual type, and also in this case the fine balancing can be abolished by chips or dust of material which is collected in the fine balancing bores, For the remedy of this disadvantage it is suggested, according to the invention, that the chuck be provided with a surrounding protection ring which can be reciprocally rotated between two fixed positions, and which in at least one of said positions exposes the pressurizing bore of the chuck, so that said bore can be reached from outside the chuck, whereas said protection ring in the other position or positions covers the pressurizing bore and prevents chips and material dust from being collected in the bore.

Preferably the fine balancing bores are drilled along the same peripheral line as the pressurizing bore, so that also said fine balancing bores are covered by the protection ring.

BRIEF DESCRIPTION OF THE DRAWINGS

Now the invention is to be described more in detail with reference to the accompanying drawings in which.

DESCRIPTION OF THE PREFERRED EMBODIMENTS

Figure 1:
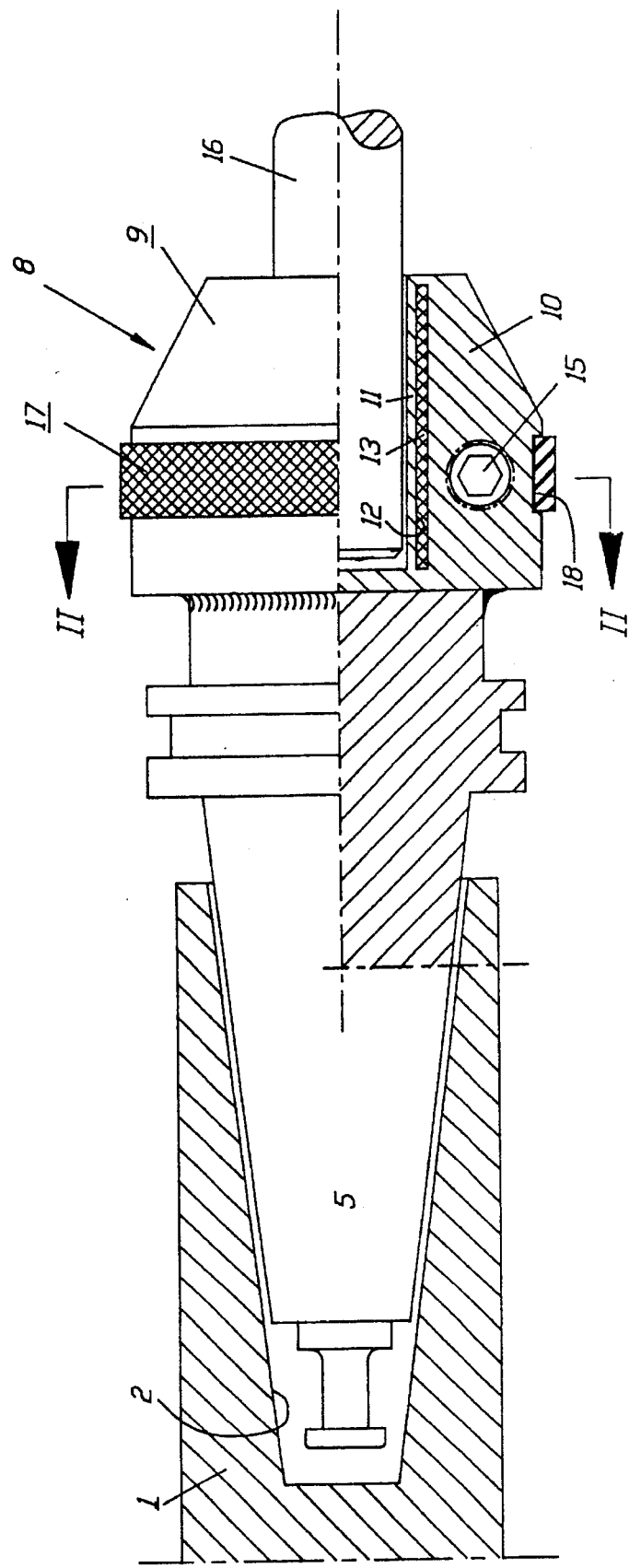
FIG. 1 shows, partly in an axial cross section, a tool chuck according to the invention having an integrated cone shaft which is introduced in a machine spindle.

The device according to the invention shown in FIG. 1 is intended to be mounted in a machine spindle 1. It is possible to weld or to solder the chuck directly onto the end face of the machine spindle, but as an alternative example, which is shown in FIG. 1, the machine spindle 1 is formed with an axial conical bore 2 into which a conical shaft 5, called a mounting cone, or the chuck can be introduced and connected.

The conical shaft 5 is integrated with a clamp portion 8 of the hydraulic clamp bushing type. Said clamp bushing, which basically is of a type known per se, comprises a housing 9 having an outer heavy house portion 10 and an inner house portion which is in the form of a relatively thin sleeve or wall 11. An annular chamber 12 is formed in a space between the house portions 10 and 11. Said chamber comprises a hydraulic, in particular a plastical pressure medium 13. The annular chamber 12 communicates hydraulically, via a passageway 12a, with a radial pressure chamber 14 containing the same type of pressure medium as that of the annular chamber 12. The mouth of the pressure chamber 14 is internally threaded and engages a pressure screw 15 which actuates the pressure medium 13 when the screw is tightened, whereby said pressure medium brings the thin inner wall 11 to expand radially inwards. The inner wall 11 thereby both centers and clamp connects the tool shaft 16 or a work piece. Instead of pressurizing the pressure medium 13 by means of a screw 15 said screw can be substituted by a pressurizing nipple, whereby the pressurization is made by means of a mobile or stationary pressure pump.

Figure 2:
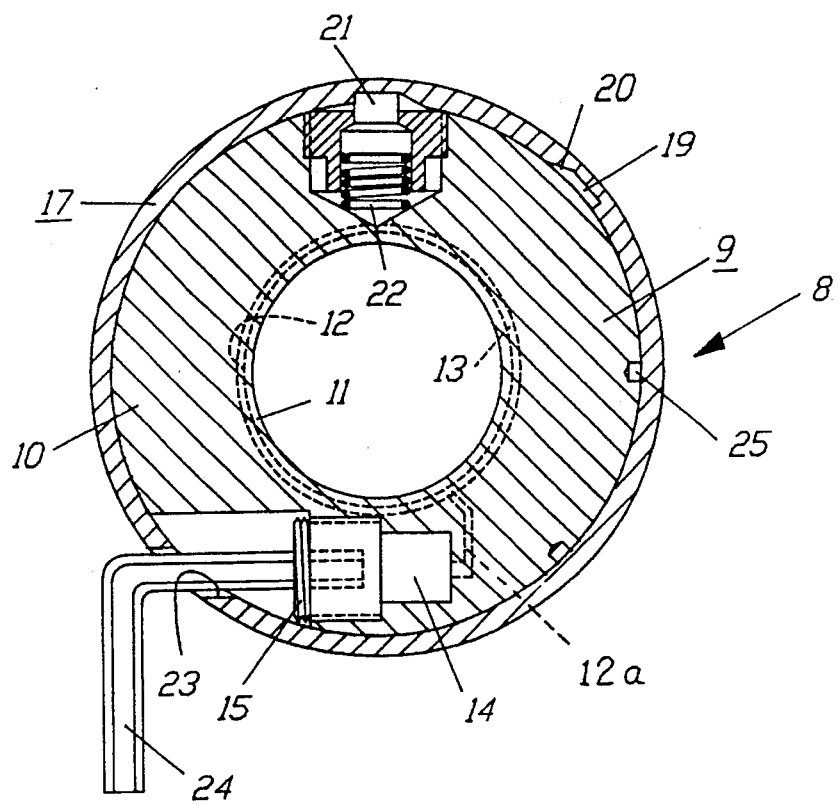
FIG. 2 is a cross section along line II—II of the apparatus of FIG. 1 in a position in which it can be pressurized.
Figure 3:
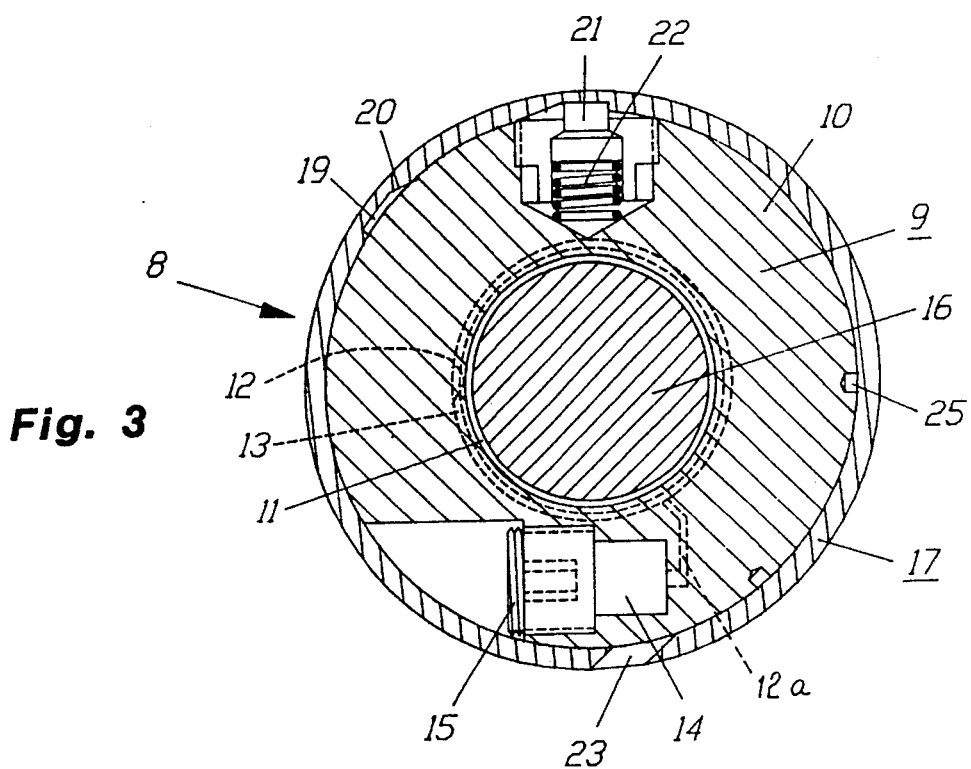
FIG. 3 shows the apparatus in the same way but with the pressurizing bore covered by a protection ring.

For protecting the chuck from chips or dust of material which may enter cavities thereof, the chuck is, round the periphery thereof, formed with a protection ring 17 which is snapped into a groove 18 extending round the periphery of the clamp bushing. The protection ring 17 preferably is made of any elastic material like rubber, synthetic rubber or a plastic material. At the inner periphery the protection ring is formed with two lock grooves 19 extending radially outwards a slight distance in the material of the ring, and each said groove 19 having an entering surface 20 facing the adjacent lock groove 19. The clamp bushing is formed with an equivalent lock pin 21 which is biased radially outwards by a spring 22. At a particular place in relation to the lock grooves 19 the protection ring 17 is formed with a through bore 23 for making it possible to introduce e.g. an Allen (hexagon) wrench 24 in the hexagon groove of a head cap pressurizing screw 15. To this end the lock grooves 19 are provided in such positions that the bore 23 is open in one end position of the protection ring, as shown in FIG. 2, whereas the bore 23 is closed in the opposite end position of the protecting ring, as shown in FIG. 3. It is obvious that the lock grooves 19 alternatively can be provided in positions suited for right hand or left hand rotation, or both.

For fine balancing purposes the tool chuck 8 is, at suitable places, formed with fine balancing bores 25, and said bores 25 preferably are formed in the peripheral chuck groove 18 for the protection ring 17 of the chuck, so that also said fine balancing bores 24 are covered by the protection ring.

The clamp bushing 8 ought to be manufactured as a separate unit which is thereafter welded or soldered to an even end surface of the mounting cone 5, or even directly onto the end face of the machine spindle 1.

The described apparatus can be manufactured as follows:

A mounting cone shaft 5 or a machine spindle is manufactured separately without any demands on precision thereon, and a clamp bushing 8 is manufactured separately, likewise without any demands on precision thereon. The machine cone or the spindle 1 and the clamp bushing 8 may be of different materials, and either or both parts may be hardened or otherwise heat treated. The clamp bushing 8 is welded to the end of the cone shaft 5 or the machine spindle 1 by means of a welding method or a soldering method which issues as little amount of heat as possible, for instance by means of electron beam welding or laser welding. It is especially important that the welding or soldering method issues so little amount of heat that the hardening or any other heat treatment of the cone 5 or the spindle 1 or the clamp bushing is not adversely affected, or that the hydraulic medium 13 of the clamp bushing is not damaged. After the parts 5 or 1 and 8 have welded or soldered together the integral unit thereby formed is finally machined in that the cone 5, or the bearing places of the machine spindle 1, is/are turned and honed, and the clamping bore for the tool shaft 16 is machined to a great accuracy as concerns radial rotary precision for the tool mounting means of the chuck, and thereby also for the clamp connected machining tool. Thereafter the apparatus is finely balanced in that fine balancing bores 25 are drilled along the groove 18 of the chuck. Finally the protection ring 17 is mounted in the illustrated position in the groove 18, and so that one of the lock grooves 19 thereof engages the end of the lock pin 21.

The chuck 8 with the cone 5 or the machine spindle I integrated therewith can now be mounted in the machine tool.

The mounting of the tool (or the work piece) 16 is made in that a tool in introduced in the clamping bore of the clamp bushing 8 with the shaft thereof, whereupon the pressure screw 15 is tightened. This makes the pressure medium 13 of the pressure medium chamber become pressurized and the thin inner walls 11 of the bushing become expanded radially outwards, whereby the tool 16, at a first stage of the screw tightening, is being centered and at the next stage of the screw tightening becomes firmly clamped in its centered position in the clamp bushing. Before the machining is started the protection ring 17 is rotated so that said ring covers the bore for the pressurization screw 15.

We claim:

1. Apparatus for clamping tools or work pieces in rotating machine tools comprising a clamp bushing connected to a mounting cone or a machine spindle to provide an integral unit, said clamp bushing comprising:

a housing comprising a thin inner sleeve and a solid outer sleeve surrounding said inner sleeve;

a chamber between said inner and outer sleeves for receiving a hydraulic pressure medium, said inner sleeve being arranged to center and clamp a rotating tool or work piece during pressurization of the hydraulic pressure medium;

a bore extending from a periphery of said housing into said chamber for providing an entrance for means for pressurizing the hydraulic pressure medium;

a protection ring about a periphery of said outer sleeve, said protection ring being rotatable relative to said bushing, said protection ring covering said bore in at least a first rotated position and exposing said bore in at least a second rotated position.

2. Apparatus according to claim 1 further comprising at least one fine-balancing bore at the periphery of said bushing for fine-balancing of the bushing, the mounting cone or the machine spindle.

3. Apparatus according to claim 2 wherein the protection ring covers the at least one fine-balancing bore.

4. Apparatus according to claim 1 wherein said bushing is connected to said mounting cone or said machine spindle by connecting means which issues a minimum amount of heat.

5. Apparatus according to claim 4 wherein said connecting means comprises electron beam welding, electron beam soldering, laser welding or laser soldering.

6. Apparatus according to claim 1 further comprising a lock pin in said housing which is spring biased in a radially outward direction from said outer sleeve.

7. Apparatus according to claim 6 wherein said protection ring comprises an inner surface having at least two lock grooves which cooperate with said lock pin for locking the protection ring at said first and second positions.

8. Apparatus according to claim 1 wherein the protection ring comprises an elastic material and said housing includes a groove around the periphery for forming a snap connection with said protection ring.

9. Apparatus according to claim 1 wherein the clamp bushing, the mounting cone and the machine spindle are manufactured as separate units.

10. Apparatus according to claim 9 wherein the clamp bushing and the mounting cone on the machine spindle are finely machined after connection to provide highly accurate radial rotation precision.

* * * * *